US012143363B2

(12) United States Patent
Adams et al.

(10) Patent No.: US 12,143,363 B2
(45) Date of Patent: Nov. 12, 2024

(54) CANBUS CYBERSECURITY FIREWALL

(71) Applicants: AT&T Intellectual Property I, L.P., Atlanta, GA (US); AT&T Mobility II LLC, Atlanta, GA (US)

(72) Inventors: Steven Adams, Union Beach, NJ (US); Maureen Langevin, Laurence Harbor, NJ (US); Christine Murphy, Belmar, NJ (US); Toby Avino, Fair Haven, NJ (US); John Liefert, Matawan, NJ (US); William O'Hern, Wall, NJ (US); Daniel Sheleheda, Florham Park, NJ (US); Jayaraman Ramachandran, Plainsboro, NJ (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 259 days.

(21) Appl. No.: 17/542,700

(22) Filed: Dec. 6, 2021

(65) Prior Publication Data

US 2023/0179570 A1   Jun. 8, 2023

(51) Int. Cl.
*H04L 9/40*   (2022.01)
*H04L 12/40*  (2006.01)

(52) U.S. Cl.
CPC .... *H04L 63/0263* (2013.01); *H04L 12/40019* (2013.01); *H04L 63/0245* (2013.01); *H04L 2012/40215* (2013.01)

(58) Field of Classification Search
CPC ............... H04L 12/40; H04L 12/40019; H04L 2012/40215; H04L 2012/40273; H04L 63/0245; H04L 63/0263; H04L 63/1416
See application file for complete search history.

(56) References Cited

U.S. PATENT DOCUMENTS

2020/0387605 A1\*  12/2020  Gilad ..................... G06F 21/577
2021/0203682 A1\*  7/2021   Bajpai .................... G06F 21/55

\* cited by examiner

*Primary Examiner* — Olugbenga O Idowu
(74) *Attorney, Agent, or Firm* — Guntin & Gust, PLC; Kenneth S. Kwan

(57) ABSTRACT

A method to create a serial wire speed firewall that can monitor and enforce security policy on a CAN buy network and prevent cyber-attacks.

20 Claims, 4 Drawing Sheets

CANBUS CYBERSECURITY FIREWALL

BACKGROUND

A Controller Area Network (CAN) bus is a robust vehicle bus standard designed to allow microcontrollers and devices to communicate with each other's applications without a host computer. It is a message-based protocol, designed originally for multiplex electrical wiring within automobiles to save on copper, but it can also be used in many other contexts. For each device, the data in a frame is transmitted sequentially but in such a way that if more than one device transmits at the same time, the highest priority device can continue while the others back off. Frames are received by all devices, including by the transmitting device.

This background information is provided to reveal information believed by the applicant to be of possible relevance. No admission is necessarily intended, nor should be construed, that any of the preceding information constitutes prior art.

SUMMARY

Malicious cyber-attacks on vehicles using CANBUS technology to interconnect components is an existing and growing threat to human life and property. A novel approach to creating a serial wire speed firewall that can monitor and enforce security policy on this network can prevent cyber-attacks.

In an example, a vehicle may include a processor and a memory coupled with the processor that effectuates operations. The operations may include monitoring a signal on a serial bus of Controller Area Network (CAN) bus system of a vehicle; converting the signal into a CAN bus frame; comparing the CAN bus frame to a policy rule; matching the policy rule with the CAN bus frame; and based on the matching of the policy rule to the CAN bus frame, sending an indication of an action to be implemented by one or more apparatuses of the CAN bus system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

There is an existing embedded base of hundreds of millions of vehicles that include CANBUS networks. There is a future planned production of hundreds of millions of vehicles (e.g., cars, tractors, dump trucks, buses, aircraft, etc.) that will contain CAN bus networks. Commonly cars use a standard CAN bus to interconnect dozens of sensors and control modules embedded in every car. These networks were designed to interconnect the sensors and processing modules within vehicles with a very low cost. These very low-cost bus networks reduce the overall security of the vehicle by exposing a multitude of vehicle components to all of the other vehicle components that are on the network. When any of the nodes is compromised or a new node is maliciously connected to the bus network exposes all the nodes to horizontal movement of malicious traffic that can compromise the vehicle. Additional risk comes from high levels of automation and connectivity through universal serial bus (USB), over-the-air (OTA), On-Board Diagnostic II (ODB2), or other interfaces that create gateway paths to nodes on the CAN bus network. The result of such a compromise can impact human life or damage of property.

The cybersecurity threat to human safety and property may be significant in terms of lives and financial risk. The embedded base of CAN bus based vehicles and the future production units have no existing or planned countermeasure to provide network security against malicious attacks. These types of attacks have been demonstrated and documented. The disclosed device may enable security policy based on network message rules and signatures thereby protecting human lives and property. As vehicles become more connected to external services the opportunity for cyber threats increases.

Unlike the disclosed subject matter, conventional security proposals involve redefining the architecture, protocols, and physical hardware of CAN bus enabled vehicles and are impractical for many reasons including cost.

The disclosed approach to add security to the vehicle CAN bus network can address the significant cybersecurity risk by detecting, blocking, or alerting when cybersecurity or the like threats are detected and create a platform to build higher level vehicle cybersecurity.

Figure 1:
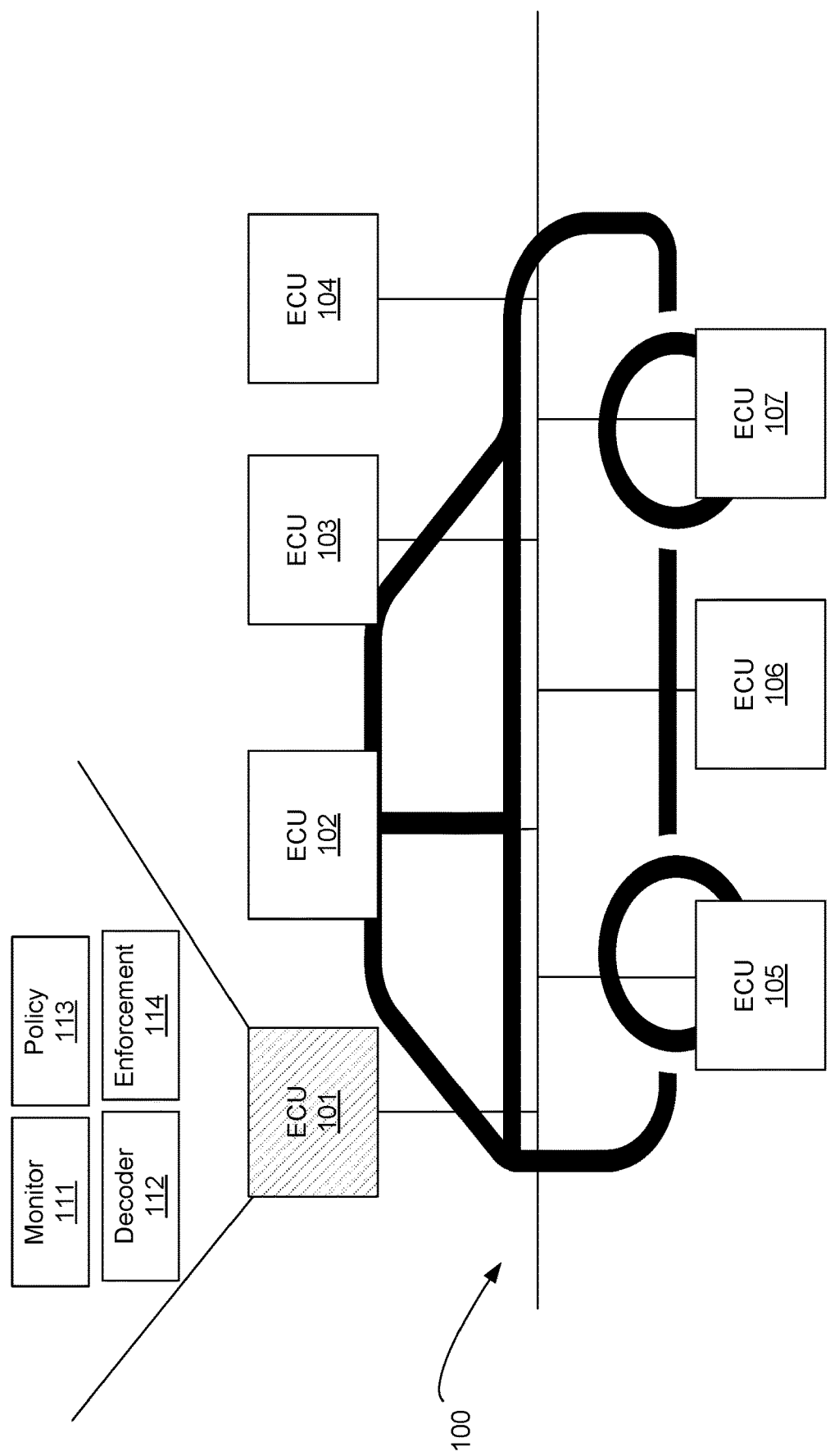
FIG. 1 illustrates an exemplary CAN bus cybersecurity system.

FIG. 1 illustrates an exemplary system for implementing a CAN bus cybersecurity system. In the automotive CAN bus system 100, there may be multiple electronic control units (ECUs), such as ECU 101, ECU 102, ECU 103, ECU 104, ECU 105, ECU 106, or ECU 107. ECUs (also referred herein as nodes or modules) may include an engine control unit, advanced lighting, navigation, airbags, sunroof, bottle cooler, or audio system, among other things. Information from ECU 101 may be shared with ECU 102 or other ECUs. Each ECU may communicate with the other ECUs. Specifically, an ECU can prepare information (e.g., sensor data) and broadcast this information via CAN bus system 100. The physical communication may happen via a CAN bus wiring harness, which may include two wires (e.g., CAN high and CAN low). The broadcasted data is conventionally accepted by all other ECUs on the CAN network, and each ECU can then check the data and determine whether to receive the data or ignore it. ECUs communicate via a single system instead of via direct complex analog signal lines, which reduces weight, errors, wiring, and costs. The CAN bus is centralized and provides one point of entry to communicate with all network ECUs—enabling central diagnostics, data logging, and configuration. Also, CAN bus system 100 is robust towards electric disturbances and electromagnetic interferences, which makes it ideal for safety critical applications. CAN bus frames are prioritized by ID, so that top priority data gets immediate bus access, without causing interruption of other frames.

With continued reference to FIG. 1, as further described herein, a CAN bus firewall (also referred herein as CAN bus cybersecurity module) may be included in an ECU, such as ECU 101, and include modules which implement the serial bus monitoring and policy enforcement capabilities. These modules may be serial bus monitor module 111, serial bus decoder module 112, policy decision engine module 113, or serial bus enforcement module 114. The modules may be physical or logic, or be included with one or more ECUs.

Serial bus monitor module 111 may have a physical interface to CAN bus system 100 and monitor the state of the electrical signals of the serial CAN bus system 100. Serial bus monitor module 111 may convert the differential electrical signals to a single state indicator. The single state indicator is serial bus monitor module 111 output that may be connected with the input of serial bus decoder module 112.

Serial bus decoder module 112 receives as input the state indicator from serial bus monitor module 111. Serial bus decoder module 112 may convert the single state indicator into a CAN bus frame. This conversion may occur at wire speed and is accomplished by software and may be assisted by hardware to do the serial to parallel conversion. The CAN bus frame may be formatted such that the following fields are placed on the CAN bus in the below order: 1) an arbitration field, 2) a control field, and 3) a data field. These fields may be required to be decoded and available to policy decision engine module 113 before the CAN bus CRC Field, and may be referred to collectively herein as a sub-frame. Arbitration is the process which decides the owner of CAN bus if two nodes started message broadcasting at the same time. Additional CAN bus system fields may be on the serial bus after the sub-frame. This field approach may allow policy decision engine module 113 to process CAN bus system 100 fields to determine when the CAN bus message should be aborted on the serial bus to prevent malicious data transactions that violate the configured policy rules.

Policy decision engine module 113 may receive the sub-frame from serial bus decoder module 112. Policy decision engine module 113 may evaluate parameters within the fields of the CAN bus frame of the CAN bus system 100 against policy rules, which may be pre-provisioned. The policy rules may include terms that can be compared against the elements of the sub-frame data elements, or flags indicating the actions that should be taken if a match is found. Actions available may be based on specific application requirements and may include actions to drop a CAN bus frame, allow a CAN bus frame, or send an alert with regard to a CANBUS frame. There may be actions by policy decision engine module 113 to link a match or a non-match to a sequential rule, which may allow complex CAN bus transaction sequences to be evaluated and managed.

When policy decision engine module 113 processes a sub-frame against the policy rules and a match exists with a drop action, policy decision engine module 113 may assert a DROP action to serial bus enforcement module 114. Similarly, if an evaluation process by policy decision engine module 113 results in an allow action, policy decision engine module 113 may indicate an ALLOW action to serial bus enforcement module 114. Further, if an evaluation process by policy decision engine module 113 results in an alert action, policy decision engine module 113 may indicate an ALERT action to serial bus enforcement module 114. The results of the evaluation of policy decision engine module 113 may be time sensitive and, in example, an action may require implementation within required time limits by serial bus enforcement module 114 to act while the CANBUS frame under examination is being put on the serial CAN bus system 100 by the transmitting node network (e.g., ECU 102 on the CAN bus system 100).

Serial bus enforcement module 114 receives policy decision engine module 113 outputs and translates these outputs of policy decision engine module 113 into actionable results that match the configured policy. For example, these inputs to serial bus enforcement module 114 are DROP, ALLOW, or ALERT.

Figure 2:
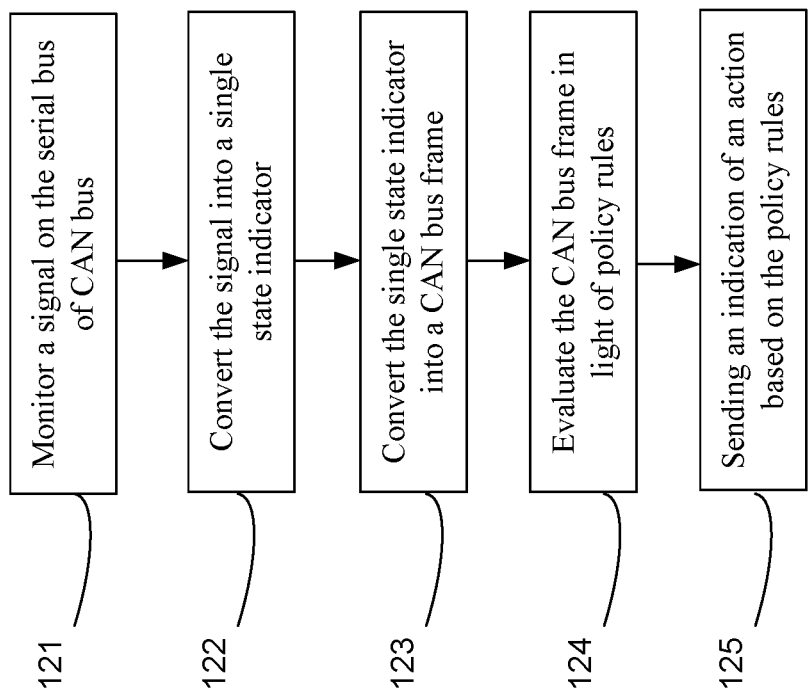
FIG. 2 illustrates an exemplary method for a CAN bus cybersecurity system.

FIG. 2 illustrates an exemplary method for CAN bus cybersecurity. The steps of this method may be within one ECU or distributed over multiple ECUs. At step 121, monitor a signal on the serial bus of CAN bus system 100. At step 122, convert the signal of step 121 into a single state indicator. At step 123, converting the single state indicator into a CAN bus frame. The CAN bus frame may include at least an arbitration field, a control field, and a data field, which may be provided in the aforementioned order. The arbitration field, control field, and the data field may be considered a sub-frame.

With continued reference to FIG. 2, at step 124, evaluating the CAN bus frame of step 123 in light of configured policy rules. Matching the contents (e.g., parameters) of the frame with a policy rule provides for a specific action. At step 125, based on matching a policy rule to contents of the CAN bus frame, sending an indication of an action (e.g., command) to be implemented by one or more apparatuses (e.g., ECUs). In an example, when a DROP command is received, serial bus enforcement module 114 may execute an operation to use an electrical signal on a CANBUS serial bus that may alter the CANBUS signal being received by other nodes monitoring the CAN bus system 100. The affect should destroy the integrity of the CAN bus frame bit stream such that the receiving nodes of the CAN bus system 100 may effectively ignore the frame, thereby implementing the DROP policy rule. An analytics component may count the number of DROP commands (or other such commands) for metrics collection purposes or for more complex actions for the CAN bus system (e.g., after reaching a threshold number of DROP or ALERT commands send a signal to deactivate one or more ECUs).

With continued reference to step 125, when an ALLOW command is received, serial bus enforcement module 114 may take no action to interfere with the CANBUS frame that is being transmitted on CAN bus system 100. An analytics component may count the number of ALLOW commands for metrics collection purposes. In another example, when an ALERT command is received, serial bus enforcement module 114 may trigger an alert action which may be defined for the application. This may be triggering of an action, such as a warning light in a car instrument cluster, logging a message for later review or diagnostic purposes, sending an email with event context information, or other action. An analytics component may count the ALERT command for metrics collection purposes. Ways in which real time embedded software design options interact with available computing and interface hardware can vary based on the required performance in varying applications. It is possible to implement a significant majority of the module processing as software on commodity computing hardware at low cost.

The disclosed module for cybersecurity on the CAN bus may be connected in various places because of the bus architecture. The CAN bus network on the vehicles have a multipoint serial network connecting the different electronic control units on the vehicle. In an example, the cybersecurity module may be plugged into an On-Board Diagnostics II (OBD-II) port which used to access the vehicle's computer for various tasks. In another example, the cybersecurity module may be connected at any of the existing interfaces where other ECUs, plug into the bus.

Figure 3:
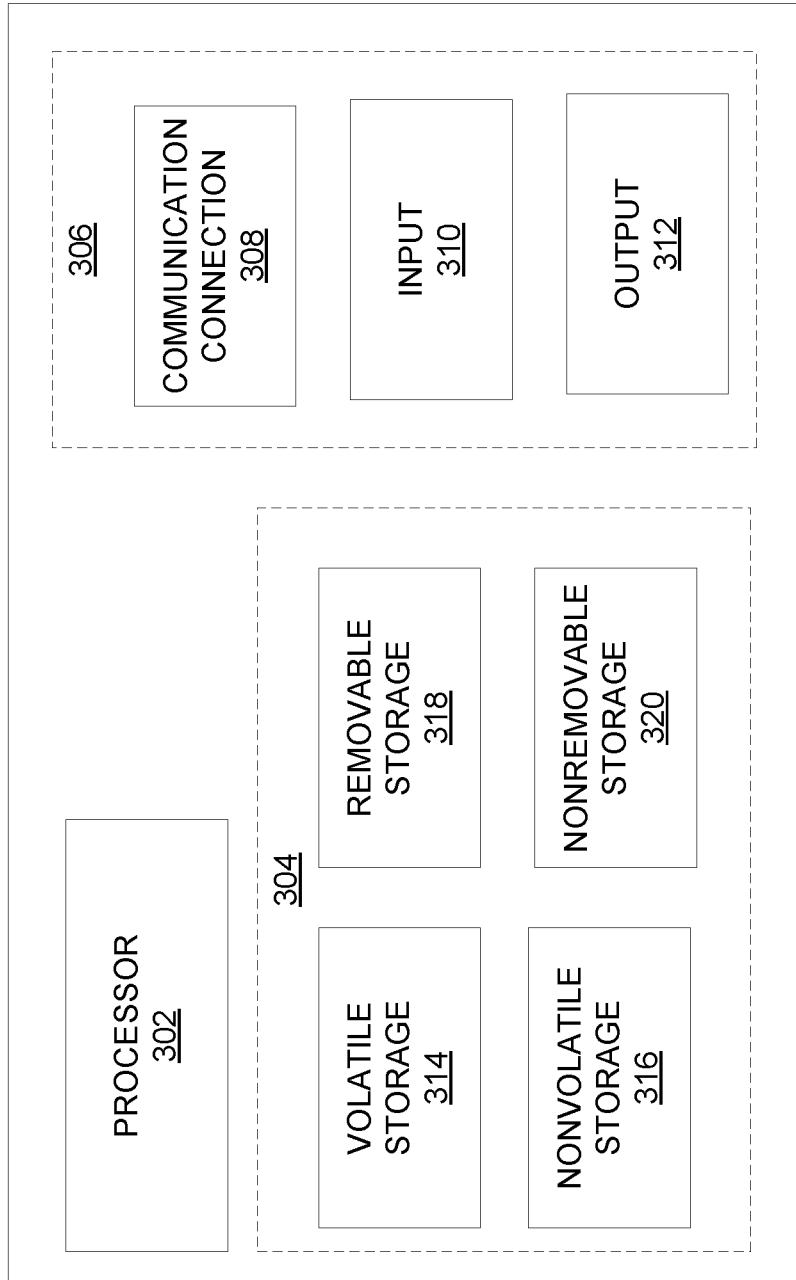
FIG. 3 illustrates a schematic of an exemplary network device.

FIG. 3 is a block diagram of network device 300 that may be connected to or comprise a component of cybersecurity related CAN bus systems. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/5G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
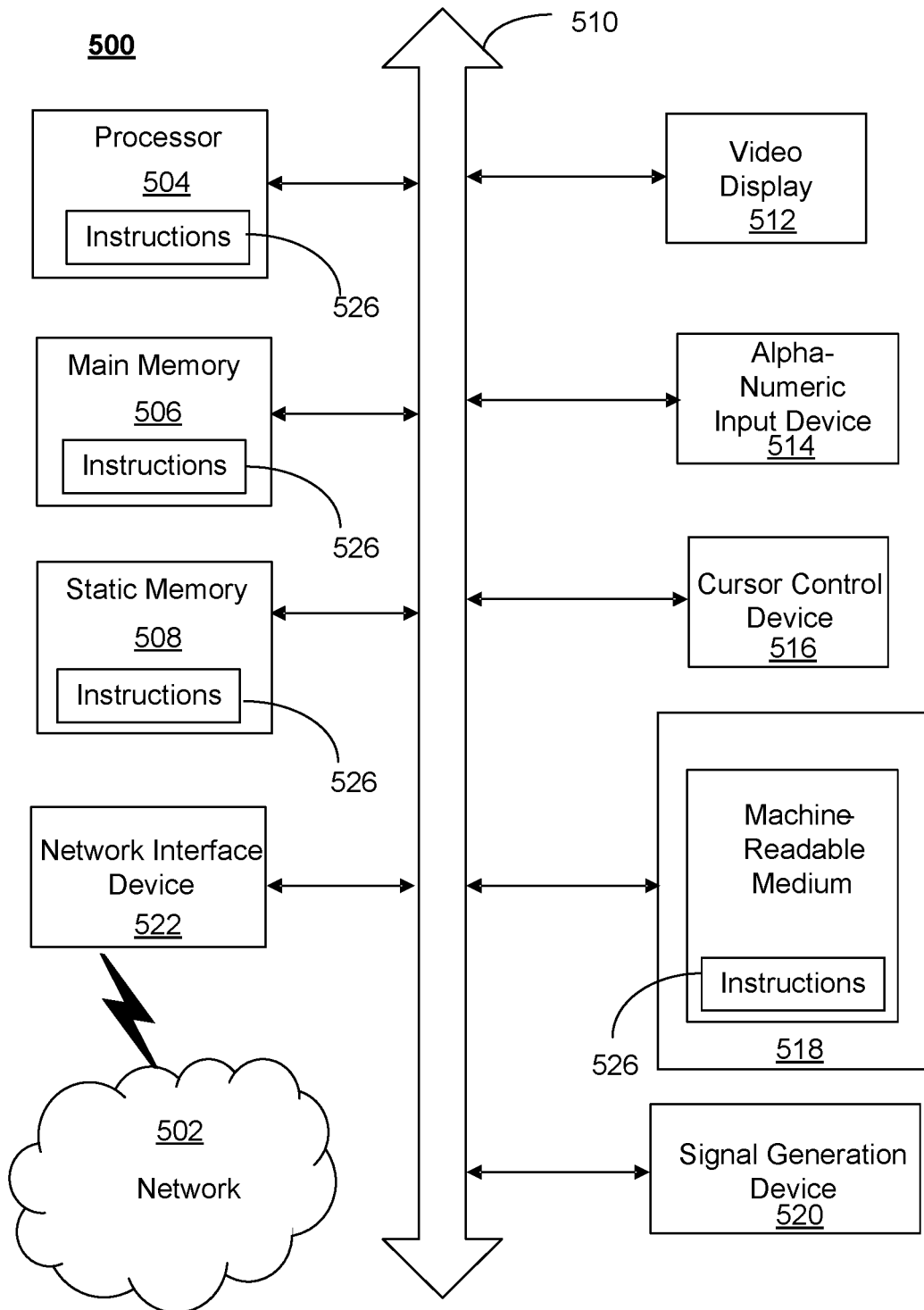
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described above. One or more instances of the machine can operate, for example, as processor 302, ECU 101, ECU 102, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

While examples of a system in which CAN bus cybersecurity alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—CAN bus cybersecurity—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for CAN bus cybersecurity. A method, system, computer readable storage medium, or apparatus provides for performing a drop action after multiple alert actions associated with an application occur on a CAN bus system. The policy rule may include performing a drop action after a threshold number of alert actions without allow actions associated with an application occurs within a period. All combinations in this paragraph (including the removal or addition of steps) are contemplated in a manner that is consistent with the other portions of the detailed description.

What is claimed:

1. An apparatus comprising:
    a processor; and
    memory coupled with the processor, the memory storing executable instructions that when executed by the processor cause the processor to effectuate operations comprising:
        monitoring a signal on a serial bus of a Controller Area Network (CAN) bus system of a vehicle, wherein the signal is associated with an application;
        converting the signal into a CAN bus frame;

comparing the CAN bus frame to a policy rule;
matching the policy rule with the CAN bus frame; and
based on the matching of the policy rule with the CAN bus frame, sending an indication of a drop action to be implemented by one or more apparatuses of the CAN bus system, wherein the policy rule specifies that a drop action is to be performed after a threshold number of alert actions have been indicated for CAN bus frames associated with the application within a period of time without any allow actions having been indicated for CAN bus frames associated with the application within that period of time, such that a drop action is not performed if an allow action is indicated for CAN bus frames associated with the application within that period of time.

2. The apparatus of claim 1, wherein the CAN bus frame comprises a sub-frame, wherein the sub-frame comprises an arbitration field, a control field, and a data field.

3. The apparatus of claim 1, wherein the CAN bus frame comprises a sub-frame, wherein the sub-frame comprises an arbitration field, a control field, and a data field, wherein the arbitration field, the control field, and the data field are in presented in the CAN bus frame in sequential order.

4. The apparatus of claim 1, wherein the policy rule used is based on a type of the application.

5. The apparatus of claim 1, wherein the application relates to an audio system, an airbag system, a navigation system, or a vehicle theft system.

6. The apparatus of claim 1, wherein the processor is included in an electronic control unit (ECU).

7. The apparatus of claim 1, wherein the policy rule includes pre-provisioned terms.

8. The apparatus of claim 7, wherein the comparing comprises comparing one or more elements of the CAN bus frame with the pre-provisioned terms.

9. The apparatus of claim 1, wherein one or more apparatuses include a serial bus enforcement module.

10. A method comprising:
monitoring a signal on a serial bus of a Controller Area Network (CAN) bus system of a vehicle, wherein the signal is associated with an application;
converting the signal into a CAN bus frame;
comparing the CAN bus frame to a policy rule;
matching the policy rule with the CAN bus frame; and
based on the matching of the policy rule with the CAN bus frame, sending an indication of a drop action to be implemented by one or more apparatuses of the CAN bus system, wherein the policy rule specifies that a drop action is to be performed after a threshold number of alert actions have been indicated for CAN bus frames associated with the application within a period of time without any allow actions having been indicated for CAN bus frames associated with the application within the period of time, such that a drop action is not performed if an allow action is indicated for CAN bus frames associated with the application within that period of time.

11. The method of claim 10, wherein the CAN bus frame comprises a sub-frame, wherein the sub-frame comprises an arbitration field, a control field, and a data field.

12. The method of claim 10, wherein the CAN bus frame comprises a sub-frame, wherein the sub-frame comprises an arbitration field, a control field, and a data field, wherein the arbitration field, the control field, and the data field are in presented in the CAN bus frame in sequential order.

13. The method of claim 10, wherein the policy rule used is based on a type of the application.

14. The method of claim 10, wherein the application relates to an audio system, an airbag system, a navigation system, or a vehicle theft system.

15. The method of claim 10, wherein the method is implemented in an electronic control unit (ECU).

16. The method of claim 10, wherein the policy rule includes pre-provisioned terms.

17. The method of claim 16, wherein the comparing comprises comparing one or more elements of the CAN bus frame with the pre-provisioned terms.

18. The method of claim 10, wherein the one or more apparatuses include a serial bus enforcement module.

19. A computer readable storage medium storing computer executable instructions that when executed by a computing device cause said computing device to effectuate operations comprising:
monitoring a signal on a serial bus of a Controller Area Network (CAN) bus system of a vehicle, wherein the signal is associated with an application;
converting the signal into a CAN bus frame;
comparing the CAN bus frame to a policy rule;
matching the policy rule with the CAN bus frame; and
based on the matching of the policy rule with the CAN bus frame, sending an indication of drop action to be implemented by one or more apparatuses of the CAN bus system, wherein the policy rule specifies that a drop action is to be performed after a threshold number of alert actions have been indicated for CAN bus frames associated with the application within a period of time without any allow actions having been indicated for CAN bus frames associated with the application within the period of time, such that a drop action is not performed if an allow action is indicated for CAN bus frames associated with the application within that period of time.

20. The computer readable storage medium of claim 19, wherein the one or more apparatuses include a serial bus enforcement module.

* * * * *